June 11, 1957    G. W. NAGEL    2,795,697
TEMPERATURE CONTROL
Original Filed June 11, 1949
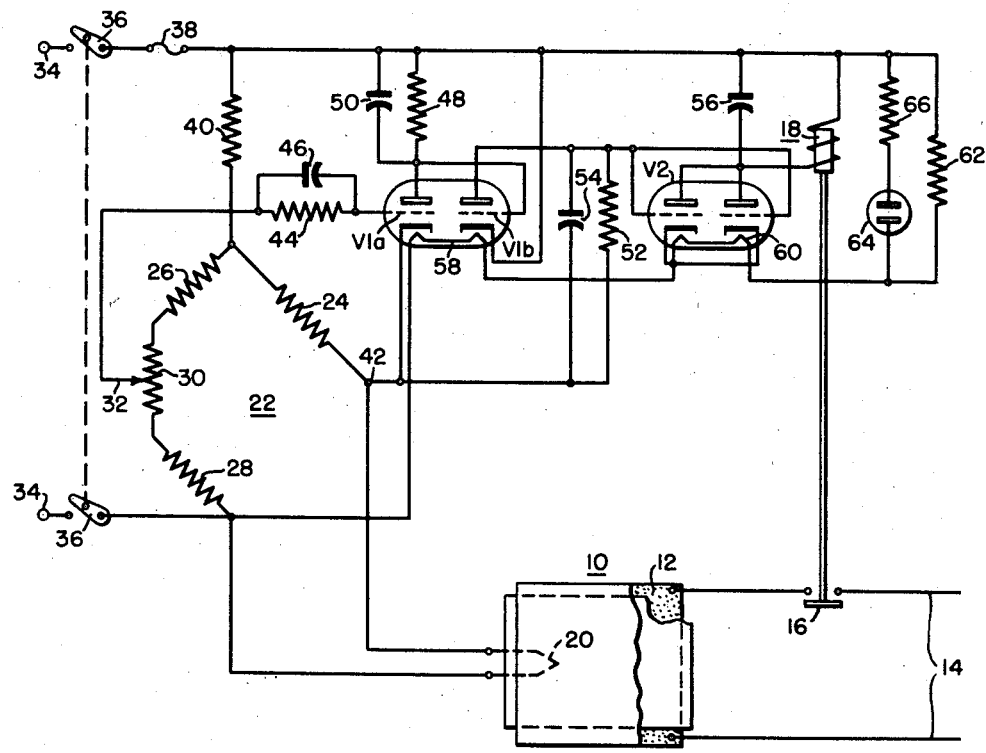
WITNESSES
Robert C. Baird
Wm. B. Sellers.
INVENTOR
George W. Nagel.
BY
Hymen Diamond
ATTORNEY

United States Patent Office 2,795,697
Patented June 11, 1957

2,795,697
TEMPERATURE CONTROL

George W. Nagel, Pittsburgh, Pa., assignor to Westinghouse Electric Corporation, East Pittsburgh, Pa., a corporation of Pennsylvania Original application June 11, 1949, Serial No. 98,548, now Patent No. 2,680,186, dated June 1, 1954. Divided and this application March 19, 1954, Serial No. 417,484

1 Claim. (Cl. 250—27)

This invention pertains to automatic temperature regulation, and particularly to a system for controlling the supply of heating energy to a body whose temperature it is desired to maintain within rather close predetermined limits. This application is a division of application Serial No. 98,548, filed June 11, 1949, now Patent Number 2,680,186 issued June 1, 1954, to Thomas C. Pridmore and me to the extent that any invention conceived by me alone is disclosed in said application, Serial No. 98,548.

It is an object of my present invention to provide a highly sensitive circuit including a balanced network for detecting variations in a property of a body, such as its temperature.

It is a more specific object of the invention to provide a temperature regulating apparatus in which the supply of heating energy to a heating element in heat interchange relation with a body whose temperature is to be controlled, is governed in acordance with a sensing element also in heat interchange relation with said body.

Still another object of the invention is to provide a control apparatus of the above type which, while relatively simple in construction, and entirely automatic in operation, nevertheless provides an extremely accurate control over the temperature maintained in the controlled body.

The manner in which the above objects of the invention are achieved by the present invention will best be understood by referring to the following detailed specification of a preferred and exemplary embodiment thereof, taken in connection with the appended drawing, the single figure of which is a schematic diagram of the complete control system.

The principles of my invention, as indicated above, may be applied to a large number of different types of applications, but for purposes of illustration a particular embodiment suitable for the temperature control of an aircraft window to prevent frosting thereof under the low temperature conditions of the ambient atmosphere, has been illustrated in the drawing and will be described in detail.

Referring now to the drawing, numeral 10 designates diagrammatically a window such as a window of an aircraft or other vehicle, the same being provided with a resistance-type electric heating element 12 which may conveniently be distributed about the area of said window (for example, by being laminated between two layers of plastic or glass which constitute the transparent pane of the window), which heating element is normally connected as at terminals 14 to a source of electric current for heating purposes, the circuit to said source including the normally opened contacts 16 of an electromagnetic relay 18 which is operated under the control of a temperature sensing element 20.

Sensing element 20 may desirably comprise a length of wire having a finite temperature coefficient of resistivity and arranged in heat conducting relation to the material comprising window 10. For the purpose of averaging out local variations in the temperature of said window, the sensing element 20 may desirably be distributed about the area of said window, it being understood that there is no electrically conductive connection between the heating element 12 and the sensing element 20.

In order to utilize the resistance of sensing element 20 to govern the application of heater power from a source 14 through contact 16 to heating element 12, I provide a Wheatstone bridge arrangement which is a balanced network designated generally by numeral 22, one leg of which is constituted by sensing element 20 and the electrically conducting leads therefor. The remaining legs of the bridge are formed by resistors 24, 26 and 28, the last two of which are joined together by a series resistor 30 provided with a movable tap 32 which may be adjusted to balance out circuit variations and to set the controlled temperature of window 10 to a desired value.

Terminals 34 are provided for connecting the Wheatstone bridge 22 and the electronic components of the control circuit to a suitable source of power which may for example be a 115 volt alternating current circuit available in the aircraft or other vehicle. A switch 36 is provided in this power supply line to put the control circuit into and out of operation, and the power supply circuit may be fused as at 38 in a well known manner. A portion of this supply voltage is supplied across one diagonal of bridge 22 through a dropping resistor 40, and in accordance with well known principles, the degree of unbalance (if any) of said bridge will be reflected as a potential across the opposite diagonal of the bridge; in the present case as a potential between contact 32 and connection 42 which is common to resistor 24 and the leg comprising the sensing element 20.

In order to amplify variations in the output potential of bridge 22 the conductor from contact 32 is connected to the control grid of a triode unit V1a (which triode unit may be one element of a dual triode tube such as an RMA type 12AX7), this control grid being negatively biased by resistor-condenser combination 44, 46 in a well known manner. The anode or plate electrode of the triode unit V1a is connected to one side of the supply line through a resistor-condenser combination 48, 50 providing control voltage to the grid of a second triode unit V1b which may be in the same envelope as V1a. Variations in the space current of triode V1a therefore control the space current in triode V1b, whose plate electrode is returned through resistor-condenser combination 52, 54 to the connection 42. The plate of triode V1b is also connected directly to both the control grids of a triode unit V2 (which may be type 12AU7) having its corresponding electrodes connected in parallel for increased power-handling capacity.

The total space current of vacuum tube V2 passes through the winding of relay 18, and across which winding may be connected a condenser 56 which will operate to smooth out variations in the potential applied to the relay coil and to eliminate chattering of its contacts. The cathode elements of tube V2 are returned to the lower side of the supply line through at least one of the heater elements 58, 60 of the respective tubes, said heaters being in series relationship with one another and with an appropriate dropping resistor 62 leading to the opposite side of the power supply. An indicator lamp 64, which may be a small neon lamp, is connected across resistance 62 in series with a dropping resistor 66, and serves to indicate that current is flowing through the heater elements 58 and 60, and hence that the apparatus is in energized condition.

In operation the values of the resistance comprising the bridge are preferably so chosen that there is no output voltage from the bridge (the bridge is balanced) when the temperature of the window is slightly below desired operating temperatures. When the bridge is unbalanced, by a further decrease in temperature, the terminal 32 becomes positive with respect to the terminal 42, during the half periods of the supply when the anode cathode potential of V1a is positive.

Under such circumstances the relay 18 is actuated and current flows through the heater. The window is heated until it reaches operating temperature at which point the bridge is slightly unbalanced in the opposite sense so that the terminal 32 becomes negative with respect to the terminal 42. At this point the control system is balanced and supplies no heating current.

Assume now that when the system is first energized the window temperature is below the point at which the bridge is balanced. The resistor-condenser combination 48, 50 provides a large negative signal to the grid of triode V1b, resulting in low space current in that unit. The resistor-condenser combination 52, 54 therefore furnishes low bias to the parallel-connected control grids of vacuum tube V2 through which a large amount of plate current consequently flows to the winding of relay coil 18, causing the relay contacts 16 to close and applying heating current from source 14 to the heating element 12.

The application of heating current to element 12 produces a temperature rise in the material constituting window 10, until the temperature thereof reaches the desired predetermined value. At this point, the resistance of sensing element 20 will have increased to magnitude above the point of bridge balance, providing a large negative bias between the grid and cathode of triode unit V1a, and therefore reducing the space current in that tube to a very small value. The resistor-condenser combination 48, 50 therefore furnishes low negative bias to the grid of unit V1b, and the space current therethrough provides a large negative bias voltage to the grids of vacuum tube V2. The reduction of plate current in the latter tube therefore deenergizes coil of relay 18, allowing contact members 16 to open, discontinuing the application of heat to window 10.

The above operation is repeated so long as the control apparatus is energized, and operates to maintain the temperature of window 10 within about 0.4° F. on either side of the desired window temperature.

It is clear from the above description that as the temperature of the sensing element 20 is increased its resistance is also increased resulting in a power-off condition of the heater 12. Also, if for any reason the sensing element 20 should develop an open circuit condition, corresponding to an infinite resistance thereof, the relay contacts will open and heater 12 will receive no power.

In order to make the apparatus "fail safe" also for short circuit condition in sensing element 20, the cathodes of tube V2 are returned to a point above the lower side of supply line from terminals 34 (for example, by connecting said return line to a point separated from the supply line by the resistance of one of the heaters 58 and 60). This arrangement provides sufficient negative bias on the grids of tube V2 to reduce the space current therein nearly to zero when the grids of tube V2 are brought to the potential of the lower side of the supply line. Since this condition will occur when the sensing element 20 is short circuited, the relay 18 will open and interrupt the current flow to heater 12 when such a short circuit condition in element 20 occurs.

In the event of failure of power supply at terminals 34, there can be no space current through tube V2 whose space current path is connected across said terminals. Under this condition also, then, relay 18 cannot close and no current will flow in the heater 12.

It will be noted from the drawing that the heaters of elements V1a, V1b and V2 are all connected in series, hence, if any of the tube filaments should become open circuited, all of the cathodes will cool down and no plate current will flow through tube V2 or through the coil of relay 18. Under this condition, therefore, relay contact members 16 will remain open and no current will flow in heater 12.

The following circuit constants applicable to the arrangements shown in the drawing are furnished by way of illustration, and without limiting the invention to these specific values:

Resistors:
    24 _____ohms__   300
    26, 28 _____do____   330
    30 _____do____    50
    40 _____do____  1500
    44, 48, 52 _____megohms__  1
    62 _____ohms__   700
    66 _____megohms__  1
Capacitors:
    46, 50, 54 _____mfd__   .01
    56 _____mfd__    .5

It is seen that the time constant of the charging network for the biasing network 44–46 which is the product of the equivalent resistance of the network 22 and the capacity 46 or substantially 300 ohms times $.01 \times 10^{-6}$ farads is $3 \times 10^{-6}$ seconds. Similarly, the time constant of the biasing network 44–46 is $.01 \times 10^{-6}$ times $1 \times 10^{-6}$ or .01 seconds.

It will be seen from the above description that I have provided a temperature control apparatus which, while quite simple and capable of extremely accurate control, also provides for discontinuance of the application of heating energy upon any kind of failure within the sensing element or the controlling apparatus itself, as well as upon failure of the power supply to said apparatus. While the invention has been described herein as applied to a particular application of window temperature control to which it is well adapted, utilizing electrical power for heating, it will be apparent to those skilled in the art that the same system of control may equally well be applied to other applications, for example to installations in which the heating energy is not electrical but may be controlled by relay 18 as by an electrically operated valve or the like. Also, the particular control circuit disclosed may be varied as to details without departing from the spirit of my invention as defined in the appended claim.

I claim as my invention:

In combination, a first conductor for supplying an alternating potential; a second conductor for supplying an alternating potential; an electric discharge device having an anode, a cathode and a control electrode; means connecting said first conductor to said anode; a sensing element which varies in impedance; a balanced network having a plurality of interconnected impedance arms and including said element in one of said arms and said balanced network also having a pair of input and a pair of output terminals; means connecting said input terminals respectively to said first and second conductors; and means including a capacitor-resistor biasing network connecting said output terminals between said control electrode and said cathode, said balanced network including means connected in said network for setting the output thereof so that it is in phase with the potential between said anode and cathode when said sensing element impedance varies in one sense from a predetermined range and is in opposite phase to the potential between said anode and cathode when said sensing element impedance varies in the opposite sense from said range, the time constant of the charging network between said control electrode and cathode being substantially $3 \times 10^{-6}$ seconds such that said biasing network is charged substantially to the peak potential between said output terminals during the half periods of said alternating potential when said potential between said output terminal is in opposite phase to the potential between said anode and cathode and said biasing network having a time constant of substantially .01 seconds such that when said capacitor is charged from said balanced network during a half period of said alternating potential said capacitor retains a substantial portion of its charge during the subsequent half period of said alternating potential.

References Cited in the file of this patent

UNITED STATES PATENTS

| | | |
|---|---|---|
| 2,084,186 | Braden | June 15, 1937 |
| 2,456,916 | Chalberg | Dec. 21, 1948 |
| 2,477,511 | Comb | July 26, 1951 |
| 2,535,133 | Hoch | Dec. 26, 1950 |
| 2,549,432 | Crowley | Apr. 17, 1951 |
| 2,573,661 | Duebel | Oct. 30, 1951 |
| 2,581,522 | Donna | Jan. 8, 1952 |